US012339973B2

(12) United States Patent
Chitalia et al.

(10) Patent No.: US 12,339,973 B2
(45) Date of Patent: Jun. 24, 2025

(54) DEVELOPER-FOCUSED CONTEXT-AWARE APPLICATION SECURITY PLATFORM

(71) Applicant: Tromzo, Inc., San Francisco, CA (US)

(72) Inventors: Harshit Naresh Chitalia, Mountain View, CA (US); Harshil Parikh, San Jose, CA (US)

(73) Assignee: TROMZO, INC., San Francisco, CA (US)

( * ) Notice: Subject to any disclaimer, the term of this patent is extended or adjusted under 35 U.S.C. 154(b) by 350 days.

(21) Appl. No.: 17/956,667

(22) Filed: Sep. 29, 2022

(65) Prior Publication Data

US 2023/0103049 A1 Mar. 30, 2023

Related U.S. Application Data

(60) Provisional application No. 63/250,658, filed on Sep. 30, 2021.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034

USPC .......................................................... 726/25
See application file for complete search history.

(56) References Cited

U.S. PATENT DOCUMENTS 11,822,672 B1 * 11/2023 Kravtsov ............. G06F 21/577
2020/0236129 A1 * 7/2020 Barkovic ............. H04L 43/045

* cited by examiner

*Primary Examiner* — Anthony D Brown
(74) *Attorney, Agent, or Firm* — Yao Legal Services, Inc.

(57) ABSTRACT

In one aspect, a system that provides a context-aware code security solution within a continuous integration and continuous deployment (CI/CD) pipeline is disclosed. During operation, the system can receive a set of security vulnerabilities generated by a set of security tools incorporated with the CI/CD pipeline. The system further receives contextual data associated with the set of security vulnerabilities from a set of DevOps tools used by the CI/CD pipeline. Next, the system augments the set of security vulnerabilities with the received contextual data. The system next prioritizes the augmented security vulnerabilities to identify a subset of high-priority vulnerabilities within the set of security vulnerabilities. The system subsequently notifies the owners of the identified subset of high-priority vulnerabilities to cause the subset of high-priority vulnerabilities to be fixed by the owners.

20 Claims, 4 Drawing Sheets

DEVELOPER-FOCUSED CONTEXT-AWARE APPLICATION SECURITY PLATFORM

CROSS-REFERENCE TO RELATED APPLICATION

This application claims the benefit of priority under 35 U.S.C. 119(e) to U.S. Provisional Patent Application Ser. No. 63/250,658, entitled "Developer Focused Context Aware Application Security Platform," by inventors Harshit Naresh Chitalia and Harshil Parikh, filed on 30 Sep. 2021, the contents of which are incorporated by reference herein.

BACKGROUND

Field

The disclosed embodiments generally relate to enabling intelligent application security. More specifically, the disclosed embodiments relate to implementing automated, unified and continuous security compliances throughout a full DevOps software development lifecycle.

Related Art

Over the past few years, widespread adoption of Cloud and DevOps culture has enabled engineering teams to significantly increase software development speed, such that moving from code commit to the cloud happens in a matter of hours. However, this software engineering trend, coupled with the fact that engineering teams have significant ownership in the choice of languages, frameworks and tools they use, have also made it increasingly more difficult to enforce application security standards. As a result, while software engineers continue to push code rapidly, application security teams face increasingly higher challenges to identify and manage risks being introduced by the code development activities.

While security teams are struggling to adapt to the current DevOps trend, they are forced to engage in large amounts of manual work to triage and prioritize false positives and noise from security tools involved in DevOps processes. In some cases, security teams are unable to match up with the DevOps speed, or simply give up. Meanwhile, resolving these security issues becomes ever more important and relevant in the face of ever-increasing application security-related breaches and issues.

Hence, what is needed is a security solution in the DevOps processes and continuous integration and continuous deployment (CI/CD) pipelines that does not suffer from the above-mentioned drawbacks of existing security solutions.

SUMMARY

In one aspect, a system that provides a context-aware code security solution within a continuous integration and continuous deployment (CI/CD) pipeline is disclosed. During operation, the system can receive a set of security vulnerabilities generated by a set of security tools incorporated with the CI/CD pipeline. The system further receives contextual data associated with the set of security vulnerabilities from a set of DevOps tools used by the CI/CD pipeline. Next, the system augments the set of security vulnerabilities with the received contextual data. The system next prioritizes the augmented security vulnerabilities to identify a subset of high-priority vulnerabilities within the set of security vulnerabilities. The system subsequently notifies the owners of the identified subset of high-priority vulnerabilities to cause the subset of high-priority vulnerabilities to be fixed by the owners.

In some embodiments, the contextual data comprise one or more of the following context types: (1) an environmental context; (2) an asset ownership context; and (3) a business context.

In some embodiments, the environmental context further includes a pre-production environment and a post-production environment.

In some embodiments, the system augments the set of security vulnerabilities with the contextual data by providing the environmental context to a given vulnerability within the set of security vulnerabilities indicating whether the given vulnerability is associated with the pre-production environment or the post-production environment.

In some embodiments, the asset ownership context specifies a developer or a developer team responsible for fixing a given security vulnerability within the set of security vulnerabilities.

In some embodiments, the given security vulnerability is associated with a software asset owned by the specified developer or the developer team.

In some embodiments, the software asset is one of the following: a service, an application, a website, a container, a virtual machine, a code repository, a code directory, an image repository, a container image, a group, a host, and an AWS environment such as a load balancers or a virtual firewall.

In some embodiments, each augmented security vulnerability within the augmented security vulnerabilities includes one or more metadata tags extracted from the contextual data for the augmented security vulnerability, and the system prioritizes the augmented security vulnerabilities to identify the subset of high-priority vulnerabilities by applying a set of priority rules to the one or more metadata tags associated with the augmented security vulnerabilities.

In some embodiments, the system applies a first priority rule among the set of priority rules by: (1) determining whether an asset associated with a given vulnerability in the augmented security vulnerabilities is internet-exposed by processing the metadata tags associated with the given vulnerability; and (2) if the asset is determined to be internet-exposed, assigning one of the highest priorities to the given vulnerability.

In some embodiments, the system applies a second priority rule among the set of priority rules by: (1) determining whether an asset associated with a given vulnerability in the augmented security vulnerabilities is targeted by an exploit code by processing the metadata tags associated with the given vulnerability; and (2a) if the asset is determined to be targeted by an exploit code, assigning one of the highest priorities to the given vulnerability, or (2b) if the asset is determined to be not targeted by any exploit code, assigning one of the lowest priorities to the given vulnerability.

In some embodiments, the system prioritizes a given security vulnerability in the augmented security vulnerabilities by combining the one or more metadata tags associated with the given security vulnerability and a criticality level of the given security vulnerability.

In some embodiments, after identifying the subset of high-priority vulnerabilities within the set of security vulnerabilities, the system further identifies a group of owners of the identified subset of high-priority vulnerabilities who are responsible for fixing the identified subset of high-priority vulnerabilities. The system subsequently notifies the identified group of owners to cause the subset of high-priority vulnerabilities to be fixed by the identified group of owners.

In some embodiments, the system notifies the identified group of owners to cause the subset of high-priority vulnerabilities to be fixed by automatically generating actionable instructions to fix the subset of high-priority vulnerabilities in an automatically generated order.

In some embodiments, after identifying the subset of high-priority vulnerabilities within the set of security vulnerabilities, the system additionally routes the identified subset of high-priority vulnerabilities to a display device for display, search, and query.

In another aspect, an apparatus for providing a context-aware code security solution is disclosed. The apparatus includes one or more processors and a memory coupled to the one or more processors. The memory storing instructions that, when executed by the one or more processors, cause the apparatus to: receive a set of security vulnerabilities generated by a set of security tools incorporated with a continuous integration and continuous deployment (CI/CD) pipeline; receive contextual data associated with the set of security vulnerabilities from a set of DevOps tools used by the CI/CD pipeline; augment the set of security vulnerabilities with the contextual data; and prioritize the augmented security vulnerabilities to identify a subset of high-priority vulnerabilities within the set of security vulnerabilities.

In yet another aspect, a continuous integration and continuous deployment (CI/CD) pipeline integrated with a context-aware security platform is disclosed. This CI/CD pipeline can include: (1) a pre-production environment including at least a build and test stage for generating a executable code of an asset; (2) a post-production environment including at least a cloud server for deploying the executable code of the asset; (3) a set of security scanners coupled to both the pre-production environment and the post-production environment and configured to scan the executable code in both the pre-production environment and the post-production environment; and (4) a context-aware code security platform coupled to the pre-production environment, the post-production environment, and the set of security scanners. This context-aware code security platform is configured to: (1) receive a set of security vulnerabilities generated by the set of security scanners; (2) receive contextual data associated with the set of security vulnerabilities from both the pre-production environment and the post-production environment; (3) augment the set of security vulnerabilities with the contextual data; and (4) prioritize the augmented security vulnerabilities to identify a subset of high-priority vulnerabilities within the set of security vulnerabilities.

In some embodiments, each augmented security vulnerability within the augmented security vulnerabilities includes one or more metadata tags extracted from the contextual data for the augmented security vulnerability, and the context-aware code security platform is configured to prioritize the augmented security vulnerabilities to identify the subset of high-priority vulnerabilities by applying a set of priority rules to the one or more metadata tags associated with the augmented security vulnerabilities.

DETAILED DESCRIPTION

Figure 1:
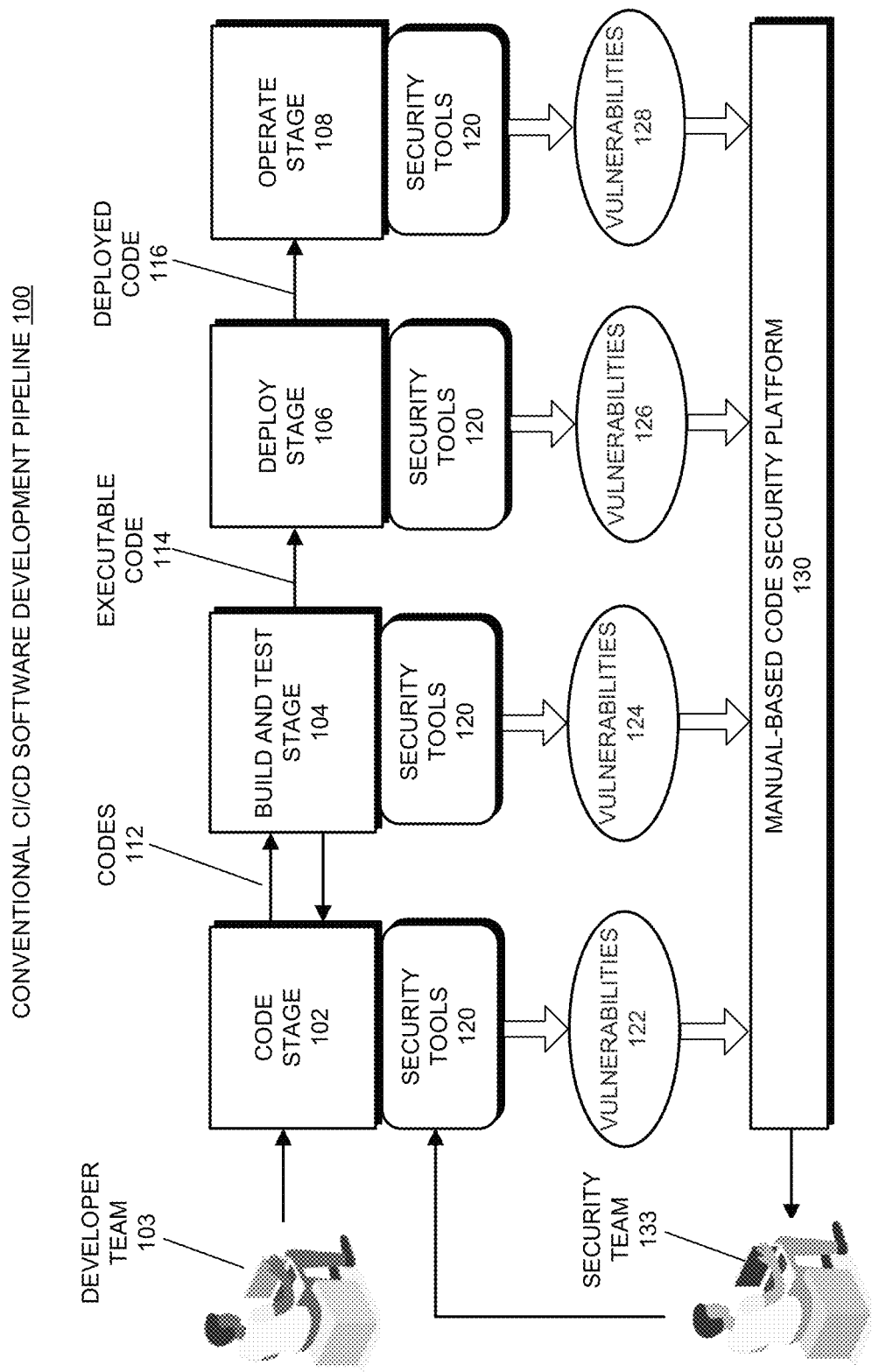
FIG. 1 shows a block diagram of a conventional CI/CD software development pipeline.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Embodiments of this disclosure provide a context-aware application/code security platform that makes security actionable for both developers and security teams, preventing security bugs and assuring compliance across continuous integration, continuous delivery, and continuous deployment (CI/CD) pipelines. In various embodiments, the disclosed application/code security platform establishes relationships between data from existing security tools, DevOps systems and cloud platforms by introducing environmental and business context to security issues, thereby facilitating reducing noise from security tools, and identifying and gaining insight into a small number of security issues that really matter. The identified context data for the security issues make them actionable not just for the security teams but also for the developers, thereby allowing the limited resources to be focused on these identified high-priority security items.

In some embodiments, the disclosed application/code security platform generates comprehensive context for security issues by collecting and establishing relationships between data from security tools, DevOps systems, and cloud platforms. Next, this complete context from code to cloud is used to not only prioritize security findings but also to automate security activities of risk identification, prioritization, remediation and communication for roles across engineering and security teams.

The disclosed context-aware code security platform provides a unified/common place within a given DevOps pipeline/workflow where full and complete security data through the DevOps workflow can be accesses. Using the disclosed context-aware code security platform, priorities to a large number of security vulnerabilities can be automatically determined, and actionable instructions to fix the critical vulnerabilities in specific order can be automatically generated and provided to both the security team and the developer team involved in the DevOps workflow.

The disclosed context-aware code security platform can significantly reduce the time to identified and fixed critical vulnerabilities, and therefore reduces critical vulnerabilities and increases the security in the CI/CD environments. The disclosed context-aware code security platform also provides a centralized visualization, search and query, and direct access interface for the critical vulnerabilities of software assets and the corresponding priorities, and other attributes such as ownership information. The disclosed context-aware code security platform facilitates determining direct ownerships of teams and developers who are responsible for the determined high-priority vulnerabilities. The disclosed context-aware code security platform addresses the pain points around noisy AppSec tools and automates processes for triaging, prioritizing, and remediation across CI/CD application security.

FIG. 1 shows a block diagram of a conventional CI/CD software development pipeline 100. As can be seen in FIG. 1, conventional CI/CD software development pipeline 100 (or "development pipeline 100") can include a sequence of stages: a code stage 102, a build and test stage 104, a deploy stage 106, and an operate stage 108, which are coupled together into a continuous loop as shown. More specifically, during a code stage 102, developer team 103 code pieces of programs to generate coded programs 112 (or simply "codes 112"). Next, during build and test stage 104, the pieces of codes 112 are integrated, and compiled into one executable code 114 and tested. For example, one of the following CI/CD tools can be used for the build and test stage 104: GitHub™ Gitlab™, Bitbucket™, Jenkins™, CirCleCI™, TravisCI™, among others. If executable code 114 passes at build and test stage 104, executable code 114 becomes ready for deployment, and is passed onto deploy stage 106. However, if executable code 114 fails at build and test stage 104, developer team 103 is notified, and development pipeline 100 returns to code stage 102. Note that the minor loop comprising code stage 102 and build and test stage 104 can repeat multiple times to fix bugs, and resolve security vulnerabilities, until codes 112 and corresponding executable code 114 passes build and test stage 104.

During the subsequent deploy stage 106, executable code 114 is updated/deployed on the servers through a set of steps to generate deployed code 116. For example, one of the following CI/CD tools can be used for deploy stage 106: Jenkins™, CircleCI™, TravisCI™, Bamboo™, Octopus Deploy™, Amazon Web Services (AWS) CodeDeploy™, Spinnaker™, among others. Finally, at the operate stage 108, deployed code 116 is released as Cloud-based services and used by the customers. The following Cloud-based tools can be used for operate stage 108: AWS™, Microsoft Azure™, Google Cloud™, Chef™, among others. Note that in a modern DevOps life cycle, development pipeline 100 generates multiple deployments (i.e., multiple versions of deployed code 116) each day and the code 112 moves from code commit to production in a matter of a few hours.

Note that the conventional security solution associated with development pipeline 100 is manual-based platform, wherein a security team scans for security bugs using a wide variety of available security tools throughout the development pipeline 100. FIG. 1 further shows the conventional security solution within conventional development pipeline 100, wherein a set of security tools 120 (also referred to as "security scanners" 120) is integrated with or otherwise incorporated into each stage of development pipeline 100, and generates security vulnerabilities (or "vulnerabilities") at each stage. Specifically, security tools 120 can generate a set of vulnerabilities 122 at code stage 102 by scanning codes 112. Security tools 120 can generate a set of vulnerabilities 124 at build and test stage 104 by scanning executable code 114. Security tools 120 can also generate a set of vulnerabilities 126 at deploy stage 106 by scanning deployed code 116. Finally, security tools 120 can continue to generate a set of vulnerabilities 128 at operate stage 108 by continuing scanning deployed code 116 at runtime. Generally speaking, security tools 120 can include any existing security scanner configured to scan code and applications to find security vulnerabilities. For example, security tools/scanners 120 can include Snyk™ Dependabot™, SonarQube™, Aqua™, Kubernetes™, Stackhawk™, Checkmarx™, Signal Sciences™, among others.

Sets of vulnerabilities 122-128 generated throughout development pipeline 100 are then manually processed through a manual-based code-security platform 130 by a human security team 133. For example, security team 133 can generate remediation decisions, including manually determining priorities to the sets of vulnerabilities 122-128, and subsequently taking correspondence actions to fix the vulnerabilities based on the determined priorities. Note that in different implementations of the conventional development pipeline 100, different security teams 133 often end up using different sets of security tools. There does not exist a unified solution for processing the identified vulnerabilities for different security teams across the different security tools.

Note that for conventional CI/CD software development pipeline 100, when each deployment cycle would take days to weeks from code commit to production, there was sufficient time to embed manual-based security team 133 in the development pipeline 100 to test each code/application, identify the security vulnerabilities, triage and prioritize these vulnerabilities, and ultimately ensure security of the code during production. However, with today's CI/CD pipelines generate multiple deployments per day, and few hours for each deployment cycle, embedding manual-based security team 133 within development pipeline 100 to scan all the code has become infeasible due to the ever-increasing amount of security issues and ever-decreasing amount of time to identify and fix these security issues. For example, thousands of vulnerabilities have been routinely identified for even those applications used by mid-market companies. Nevertheless, the need for ensuring security against critical vulnerabilities in each new update of the code before putting into production is ever more imperative. Note that the problem of lack of time to react/prioritize the large amount of vulnerabilities is further exacerbated by the sheer volume of data associated with today's cloud-based applications.

Figure 2:
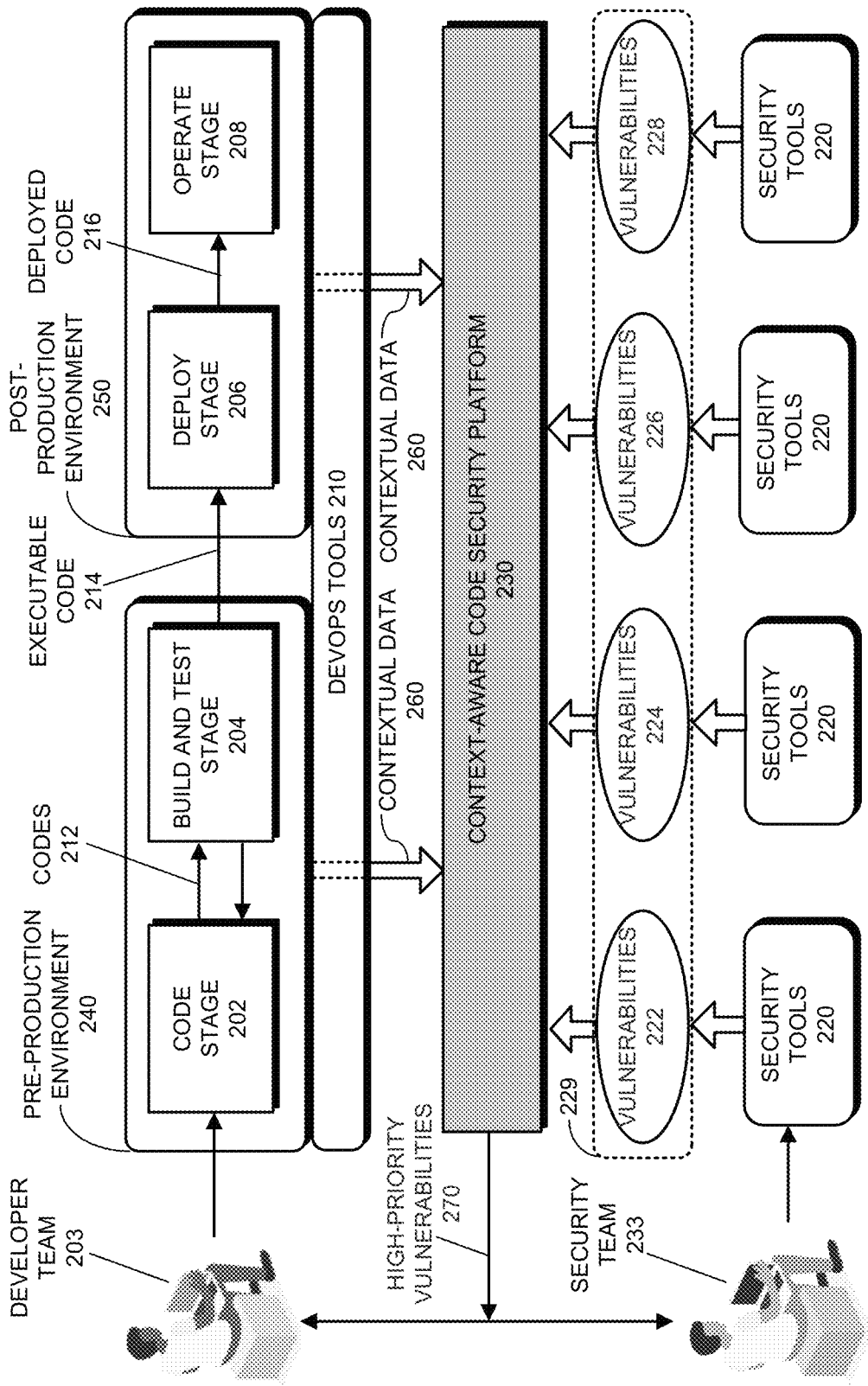
FIG. 2 shows a block diagram of a CI/CD software development pipeline integrated with a proposed context-aware code security platform in accordance with some embodiments.

FIG. 2 shows a block diagram of a CI/CD software development pipeline 200 integrated with a proposed context-aware code security platform 230 in accordance with some embodiments. As can be seen in FIG. 2, CI/CD software development pipeline 200 (or "development pipeline 200") still includes the sequence of conventional CI/CD stages, i.e., code stage 202 where developer team 203 generates codes 212, build and test stage 204 that generates executable code 214, deploy stage 206 that generates deployed code 216, and operate stage 208 where deployed code 216 is under production use by the customers. Note that the above-described operations for the set of CI/CD stages in development pipeline 100 are equally applicable to the corresponding set of stages having the like reference numerals in software development pipeline 200. Development pipeline 200 still includes the set of security tools 220 that is incorporated with the set of CI/CD stages in development pipeline 200 to generate multiple sets of vulnerabilities 222-228 associated with the set of stages 202-208. For simplicity of referencing, the multiple sets of vulnerabilities 222-228 are collectively referred to as "the collection of vulnerabilities 229" or "vulnerabilities 229" below.

Development pipeline 200 further includes the proposed context-aware code security platform 230, which is coupled between the set of CI/CD stages 202-208 and the set of security tools 220. Similar to manual-based code security platform 130, context-aware code security platform 230 still receives the collection of vulnerabilities 229 as inputs from security tools 220. However, different from manual-based code security platform 130, context-aware code security platform 230 additionally receives contextual data 260 from the set of CI/CD stages 202-208 as additional inputs. In various embodiments, contextual data 260 can include the following categories/types of context: (1) environmental context; (2) asset ownership context; and (3) business context. In some embodiments, the environmental context can include a pre-production environment context (or simply "pre-production context") and a post-production environment context (or simply "post-production context"). In some embodiments, the post-production context can further include a runtime context which is associated with the operate stage 208 in development pipeline 200. In various embodiments, the runtime context further specifies a set of runtime metadata tags/attributes which can include but are not limited to: whether a given software asset at runtime is exposed to the internet, the entity who is running the given software asset during production, and the identity of the AWS account at runtime. In some embodiments, the asset ownership context identifies the code/team ownership of a software asset associated with an identified vulnerability. Note that the business context can include a set of attributes indicative of the level of importance a given software asset to a given business, e.g., the set of attributes can specify whether the software asset stores one or more forms of the following sensitive personal information: social security number (SSN), credit card information, health data; whether the software asset hosts proprietary algorithms or security data, among others.

Note that to obtain the contextual data 260, context-aware code security platform 230 interfaces with the set of CI/CD stages 202-208 through an ensemble of aforementioned cloud-based DevOps tools 210 used by the set of CI/CD stages, including but not limited to, GitHub™, Gitlab™, Bitbucket™ Jenkins™, CircleCI™, TravisCI™, Bamboo™, Octopus Deploy™, AWS CodeDeploy™, Spinnaker™, Microsoft Azure™, Google Cloud™, Chef™, Amazon Web Services™, and DataDog™.

As can be seen in FIG. 2, the set of CI/CD stages 202-208 in development pipeline 200 can be broken up into a pre-production environment 240 comprising code stage 202 and build and test stage 204, and a post production environment 250 comprising deploy stage 206 and operate stage 208. Note that context-aware code security platform 230 is configured to receive contextual data 260 from both pre-production environment 240 and post-production environment 250 through the set of DevOps tools 210. Context-aware code security platform 230 is further configured to establish relationships between the received contextual data 260 and the received vulnerabilities 229 by augmenting each of vulnerabilities 229 with corresponding contextual data within contextual data 260. Based on the added metadata tags and attributes for a given vulnerability in vulnerabilities 229, context-aware code security platform 230 is further configured to apply priority rules to the augmented vulnerabilities and establish priorities for the set of vulnerabilities 229. This allows a small subset of high-priority vulnerabilities to be identified, which can be used to generate actionable security remediation instructions for both security teams 233 and developer team 203, thereby allowing the limited security-solution resources to be focused on a small number of high-priority security issues.

During pre-production environment 240, each unique software asset within CI/CD software development pipeline 200 can be identified and subsequently tracked by context-aware code security platform 230. Note that software assets applicable in the scope of this disclosure can include, but are not limited to: a service, an application, a site (or a "website"), a container, a virtual machine, a code repository, a code directory, an image repository, a container image, a group, a host, and any of the AWS environments such as a load balancers or a virtual firewall. For each identified software asset, context-aware code security platform 230 is further configured to identify one or more vulnerabilities (if any) within the set of vulnerabilities 229 that are uniquely associated with the identified software asset.

After correlating a given identified software asset to the one or more identified vulnerabilities, context-aware code security platform 230 is further configured to, for each vulnerability associated with the identified software asset (or "the associated vulnerability"), obtain an environmental context (which is just one form of contextual data 260) which specifies whether the associated vulnerability is identified within pre-production environment 240 (i.e., environmental context=Pre-Production) or within the post-production environment 250 (i.e., environmental context=Post-Production). If the received environmental context indicates that the associated vulnerability is identified within post-production environment 250, such as directly related to operate stage 208, the associated vulnerability can be assigned with a more-critical/higher priority vulnerability. Note that a vulnerability for a software asset within the post-production phase is more critical than the same software asset within the pre-production phase because the software asset is exposed to the internet in the former scenario. In contrast, if the received environmental context indicates that the associated vulnerability is identified within pre-production environment 240, such as related to internal testing at code stage 202, the associated vulnerability can be assigned with a less-critical/low priority vulnerability.

In addition to obtaining the environmental contexts for the received vulnerabilities associated with a given identified software asset, in some embodiments, context-aware code security platform 230 is further configured to obtain the metadata tags/attributes for the given software asset from the received contextual data 260. For example, context-aware code security platform 230 can use the Application Programming Interface (API) associated with the given software asset to extract the metadata tags from the source code of the software asset, which are then obtained as contextual data 260.

In some embodiments, the metadata tags for the given software asset obtained from contextual data 260 include a code/team ownership of the identified software asset. In this regard, the type of contextual data 260 is referred to as "the team ownership" or "the code ownership". By extracting the ownership information from contextual data 260, context-aware code security platform 230 can then notify security team 233 who owns a given software asset, and therefore responsible for fixing the associated vulnerabilities. As a result, security team 233 can locate the code owner (i.e., the right developer team 203) based on the received ownership information.

In some embodiments, the disclosed context-aware code security platform 230 is configured to extract one or more metadata tags from contextual data 260, and apply the extracted one or more metadata tags to each of a large number of code repositories used by a given software asset during build and test stage 204. For example, the metadata tags relevant to a given code repository can include: (1) which specific AWS account the code repository is published to; and (2) the ownership of the code repository (i.e., which developer team owns the code repository). Note that establishing ownerships to a given software asset, including establishing ownership to each code repository used by the given software asset is one of the important and unique functions of the disclosed context-aware code security platform 230. The combination of various metadata tags assigned to a large number of code repositories allow for identifying, among the large number of code repositories (which is often in the number of a few hundreds or more), a smaller number of code repositories that are most critical (also referred to as "critical resources") to the given software asset.

After identifying the smaller number of critical code repositories, the disclosed context-aware code security platform 230 can then identify from those received vulnerabilities 229 generated by the security tools 220, a subset of high-priority vulnerabilities 270 within the set of vulnerabilities 229 that is associated with and therefore affects these identified critical resources. Next, the disclosed context-aware code security platform 230 can notify the security team 233 the following: (1) which code repositories are identified as critical resources; (2) which of the identified vulnerabilities 270 are associated with the identified critical resources; and (3) who are the owners of the identified critical resources and the associated vulnerabilities 270 and therefore responsible for fixing the high-priority vulnerabilities 270. Consequently, security team 233 can track down the identified owner(s) to the identified critical resources and the associated vulnerabilities 270, and causes the high-priority vulnerabilities 270 to be fixed by the identified owner(s). In contrast to the disclosed context-aware code security platform 230, in conventional development pipeline 100, security team 133 is not capable of determining which code repositories among a large number of code repositories are the more important ones.

Figure 3:
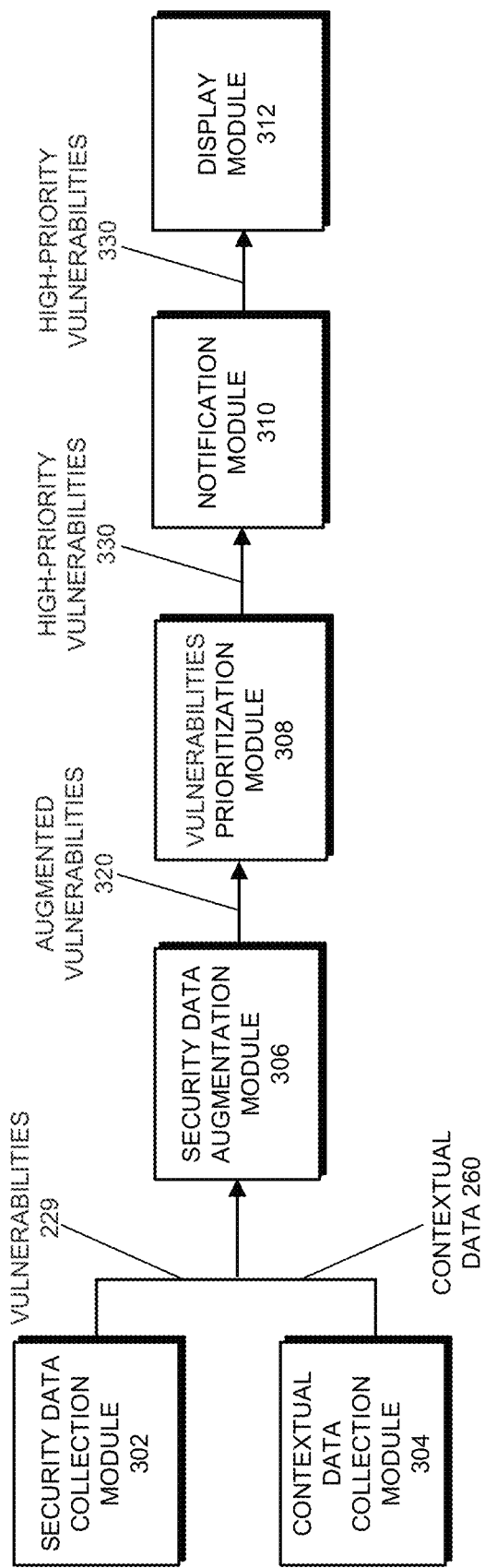
FIG. 3 shows a block diagram of an exemplary implementation of the disclosed context-aware code security platform in FIG. 2 in accordance with some embodiments.

FIG. 3 shows a block diagram 300 of an exemplary implementation of context-aware code security platform 230 in accordance with some embodiments. As can be seen in FIG. 3, context-aware code security platform 300 includes a security data collection module 302, a contextual data collection module 304, a security data augmentation module 306, a vulnerability prioritization module 308, notification module 310, and a display module 312, which are coupled in the manner shown. As described above in conjunction with the system of FIG. 2, context-aware code security platform 300 is coupled to both the set of security tools/scanners 220 and the ensemble of DevOps tools 210 described in conjunction with development pipeline 200.

In some embodiments, security data collection module 302 is configured to determine if any vulnerability has been found by security tools 220. If not, security data collection module 302 can continue to monitor the output from security tools 220 without taking further actions. However, if vulnerabilities have been found, security data collection module 302 is further configured to collect vulnerabilities 229 from the set of security tools 220. Concurrently or sequentially, contextual data collection module 304 is configured to collect contextual data 260 associated with vulnerabilities 229 from the ensemble of DevOps tools 210. Next, security data augmentation module 306 is used to receive the contextual data 260 outputted from contextual data collection module 304 and vulnerabilities 229 outputted from security data collection module 302, and subsequently transform the received vulnerabilities 229 by augmenting vulnerabilities 229 with the received contextual data 260. Note that contextual data 260 includes various metadata tags associated with each software asset used by or presented in different stages of the CI/CD pipeline 200. Because each vulnerability 229 is associated with a given software asset used by the CI/CD pipeline 200, security data augmentation module 306 is configured to assign a set of metadata tags in the contextual data 260 to a given vulnerability 229 based on the common software asset associated with both the set metadata tags and the given vulnerability 229.

In some embodiments, contextual data 260 includes an environmental tag based on the aforementioned environmental context indicative of whether a given vulnerability is associated with pre-production phase 240 or post-production phase 250 of the CI/CD pipeline 200. As another example, contextual data 260 can include a code ownership tag/attribute based on the aforementioned asset ownership context, which is used to identify the ownership of the software asset associated with a given vulnerability. As yet another example, contextual data 260 can include metadata tags based on the aforementioned asset ownership context that can be used to identify a small number of critical resources (i.e., repositories) among a large number of code repositories used by the given software asset. As still another example, contextual data 260 can include metadata tags based on the aforementioned business context that can be used to determine the level of importance of a given software asset to a given business.

Security data augmentation module 306 subsequently outputs augmented vulnerabilities 320, which are the inputs to vulnerabilities prioritization module 308. Note that vulnerabilities prioritization module 308 is configured to prioritize the augmented vulnerabilities 320 to identify a subset of the highest-priority (e.g., the most critical) vulnerabilities within the augmented vulnerabilities 320. In various embodiments, vulnerabilities prioritization module 308 is configured to prioritize the augmented vulnerabilities 320 by applying a set of priority rules to the augmented vulnerabilities 320, and specifically based on the metadata tags and attributes associated with the augmented vulnerabilities 320. Note that herein the metadata tags can include both metadata tags extracted from the outputs of DevOps tools 210, and various user-customized metadata tags. As an example, a user-customized metadata tag can be based on how often an asset associated with the augmented vulnerability is being commented on. For example, if the asset has been commented on most recently, e.g., within the last three weeks, a "highly-active" tag can be assigned to the given augmented vulnerability. If the asset has been commented on recently, e.g., within the last three months, an "active" tag can be assigned to the given augmented vulnerability. If the asset has not been commented on recently, e.g., within the last three months, an "inactive" tag can be assigned to the given augmented vulnerability.

In a particular embodiment of vulnerabilities prioritization module 308, a first priority rule is applied to the augmented vulnerabilities 320 to determine whether an asset associated with a given augmented vulnerability is internet-exposed by processing the associated metadata tags. If the asset is determined to be internet-exposed, vulnerabilities prioritization module 308 automatically assigns one of the highest priorities to the associated vulnerability. Note that in this example, one of the associated metadata tags is internet_exposed, which can have either a "True" value or a "False" value. In another embodiment of vulnerabilities prioritization module 308, a second priority rule is applied to the augmented vulnerabilities 320 to determine whether an asset associated with a given augmented vulnerability is targeted by an exploit code by processing the associated metadata tags. If the asset is determined to be targeted by an exploit code, vulnerabilities prioritization module 308 automatically assigns one of the highest priorities to the associated vulnerability. However, if the asset is determined to be not targeted by any exploit code, vulnerabilities prioritization module 308 automatically assigns one of the lower priorities to the associated vulnerability. Note that in the above embodiment, one of the associated metadata tags is exploit_available, which can have either a "True" value or a "False" value. As described above, vulnerabilities prioritization module 308 can concurrently or sequentially apply multiple priority rules, such as both the first priority rule and the second priority rule described above to the augmented vulnerabilities 320 in order to determine the corresponding priorities.

The following are a few specific examples of the set of priority rules that can be used by vulnerabilities prioritization module 308:

Post-production Priority Rule #1: If a critical vulnerability is found by a security tool 220 and the critical vulnerability is found to be associated with an asset with a metadata tag internet_exposed=True, then assign the highest priority to the identified critical vulnerability;

Post-production Priority Rule #2: If a critical vulnerability is found, and the critical vulnerability contains text "XSRF token" and has a metadata tag exploit_available=True, then assign the highest priority to the identified critical vulnerability;

Pre- and Post-production Priority Rule #3: If a high or critical vulnerability is found and the vulnerability is found to be associated with an asset with a metadata tag exploit_available=False, then assign a low priority to the identified critical vulnerability.

As a result of applying the set of priority rules by vulnerabilities prioritization module 308 to augmented vulnerabilities 320, vulnerabilities prioritization module 308 outputs a set of identified high-priority vulnerabilities 330, which is a small subset within the augmented vulnerabilities 320.

After generating high-priority vulnerabilities 330, context-aware code security platform 300 uses notification module 310 to identify the owners of the high-priority vulnerabilities 330 and therefore responsible for fixing the high-priority vulnerabilities 330, wherein the notification module 310 subsequently notifies the identified owners to cause the high-priority vulnerabilities 330 to be fixed by the identified owners. Subsequently, notification module 310 routes high-priority vulnerabilities 330 to display module 312, which is configured to display the identified high-priority vulnerabilities 330 into an asset-vulnerability graph on a user interface. In some embodiments, the asset-vulnerability graph of the identified high-priority vulnerabilities displays each asset (e.g., a code repository) associated with the high-priority vulnerabilities 330, and all of the identified high-priority vulnerabilities associated with the each displayed asset.

In some embodiments, the set of identified high-priority vulnerabilities can be displayed in a chain of stages indicating their associated priorities. In some embodiments, the asset-vulnerability graph also displays the team ownership tag for each asset associated with the high-priority vulnerabilities 330. In further embodiments, the asset-vulnerability graph is configured to allow a user to make queries, e.g., by requesting through the UI of the display module 312 those critical vulnerabilities to be displayed. In some embodiments, the asset-vulnerability graph is also configured to allow a user to perform simple search of a specific type of critical vulnerabilities through the UI of the display module 312. Note that the display module 312 provides a unified/common place within the DevOps pipeline 200 where full and complete security data generated by the disclosed context-aware code security platform 230 can be accesses by a user.

Figure 4:
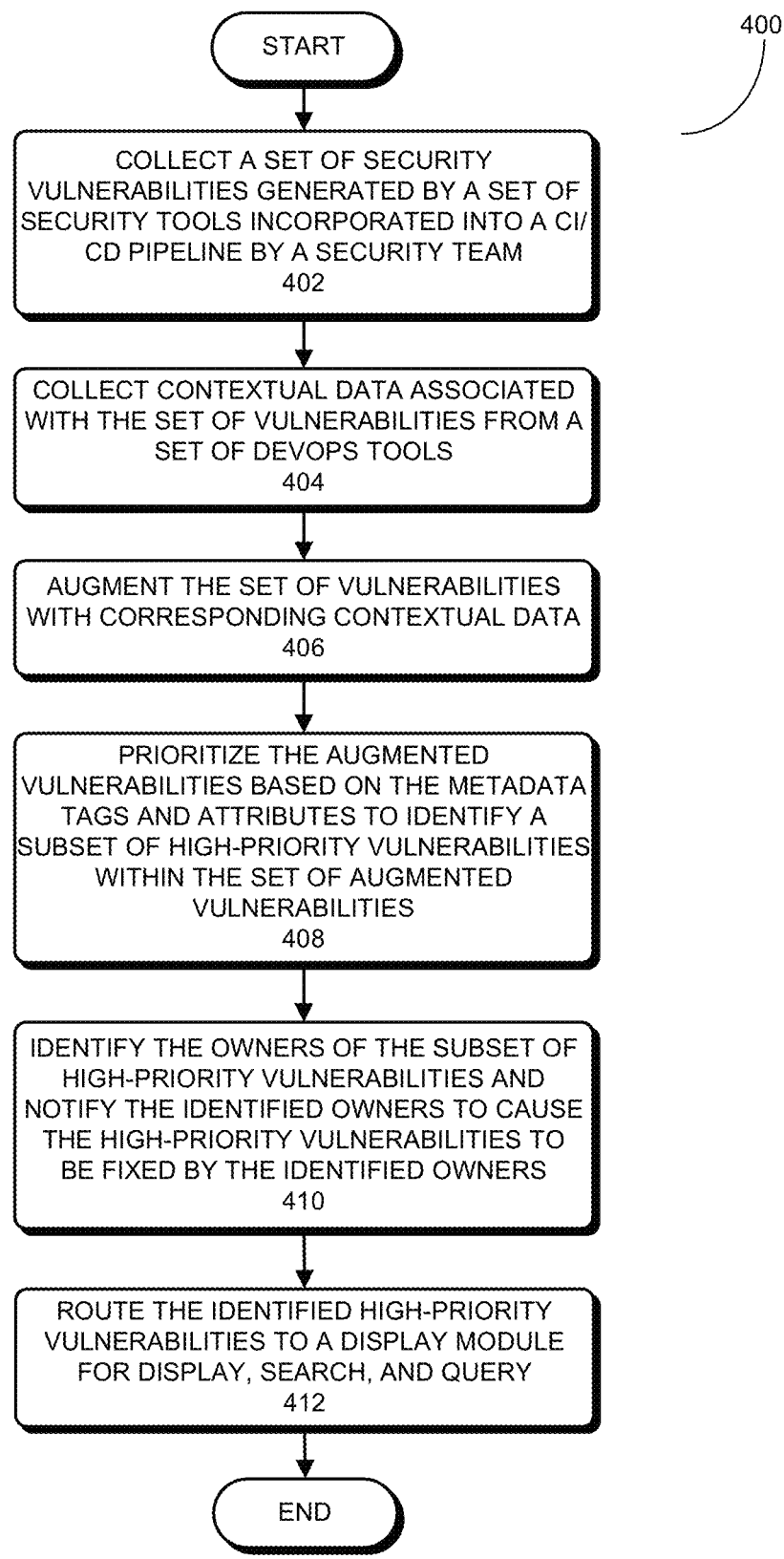
FIG. 4 presents a flowchart illustrating an exemplary process for prioritizing security vulnerabilities generated from a CI/CD pipeline in accordance with some embodiments described herein.

FIG. 4 presents a flowchart illustrating an exemplary process 400 for prioritizing security vulnerabilities generated from a CI/CD pipeline in accordance with some embodiments described herein. During operation, process 400 collects a set of security vulnerabilities generated by a set of security tools incorporated into a CI/CD pipeline by a security team (step 402). Process 400 additionally collects contextual data associated with the set of security vulnerabilities from a set of DevOps tools (step 404). Next, process 400 augments the set of vulnerabilities with the corresponding contextual data (step 406). For example, process 400 may add environmental context to each of the security vulnerabilities indicating whether the given vulnerability is associated with the pre-production phase or the post-production phase of the CI/CD pipeline. As another example, process 400 can add a code ownership attribute for the software asset associated with a given vulnerability.

Next, process 400 prioritizes the augmented vulnerabilities based on the metadata tags and attributes to identify a subset of high-priority vulnerabilities within the set of augmented vulnerabilities (step 408). For example, the subset of high-priority vulnerabilities can include the most critical vulnerabilities. In various embodiments, process 400 prioritizes the augmented vulnerabilities based on the associated metadata tags and attributes by applying a set of priority rules to the augmented vulnerabilities, and specifically using the set of priority rules to process the associated metadata tags and attributes of the augmented vulnerabilities. After identifying the subset of high-priority, e.g., the most critical vulnerabilities, process 400 identifies the owners of the subset of critical vulnerabilities and subsequently notifies the identified owners to cause the subset of high-priority vulnerabilities to be fixed by the identified owners (step 410). Finally, process 400 routes the identified high-priority vulnerabilities to display module, wherein the identified high-priority vulnerabilities can be displayed and queried (step 412).

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, fieldprogrammable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method for providing a context-aware code security solution within a continuous integration and continuous deployment (CI/CD) pipeline, the method comprising:
   receiving a set of security vulnerabilities generated by a set of security tools incorporated with the CI/CD pipeline, wherein the set of security vulnerabilities comprises one or more vulnerabilities indicated by the set of security tools at a respective stage of a plurality of stages of the CI/CD pipeline;
   receiving, for the plurality of stages of the CI/CD pipeline, contextual data associated with the set of security vulnerabilities from a set of DevOps tools used by the CI/CD pipeline, wherein the contextual data comprises ownership information identifying an entity responsible for fixing a respective security vulnerability in the set of security vulnerabilities;
   augmenting the set of security vulnerabilities with the contextual data; and
   prioritizing the augmented security vulnerabilities to identify a subset of high-priority vulnerabilities within the set of security vulnerabilities.

2. The computer-implemented method of claim 1, wherein the contextual data further comprises one or more of the following context types:
   an environmental context; and
   a business context.

3. The computer-implemented method of claim 2, wherein the environmental context further includes:
   a pre-production environment; and
   a post-production environment.

4. The computer-implemented method of claim 2, wherein augmenting the set of security vulnerabilities with the contextual data comprises providing the environmental context to a respective vulnerability of the set of security vulnerabilities indicating whether the vulnerability is associated with the pre-production environment or the post-production environment.

5. The computer-implemented method of claim 1, where the entity responsible for fixing the security vulnerability includes a developer or a developer team.

6. The computer-implemented method of claim 5, wherein the security vulnerability is associated with a software asset owned by the specified developer or the developer team.

7. The computer-implemented method of claim 6, wherein the software asset is one of the following:
   a service;
   an application;
   a website;
   a container;
   a virtual machine;
   a code repository;
   a code directory;
   an image repository;
   a container image;
   a group;
   a host; and
   an AWS environment such as a load balancers or a virtual firewall.

8. The computer-implemented method of claim 1, further comprising:
   including one or more metadata tags extracted from the contextual data into a corresponding augmented security vulnerability in the augmented security vulnerabilities; and
   applying a set of priority rules to the one or more metadata tags to determine a priority associated with the augmented security vulnerability.

9. The computer-implemented method of claim 8, wherein applying a first priority rule in the set of priority rules comprises:
   determining whether an asset associated with the augmented security vulnerability is internet-exposed by processing the one or more metadata tags; and
   in response to the asset being internet-exposed, assigning a high priority to the augmented security vulnerability.

10. The computer-implemented method of claim 8, wherein applying a second priority rule in the set of priority rules comprises:
    determining whether an asset associated with the augmented security vulnerability is targeted by an exploit code by processing the one or more metadata tags;
    in response to the asset being targeted by the exploit code, assigning a high priority to the augmented security vulnerability; and
    in response to the asset not being targeted by any exploit code, assigning a low priority to the augmented security vulnerability.

11. The computer-implemented method of claim 8, further comprising combining the one or more metadata tags and a criticality level of the the augmented security vulnerability.

12. The computer-implemented method of claim 1, further comprising:
    determining a group of entities responsible for fixing the subset of high-priority vulnerabilities based on the augmented security vulnerabilities; and
    notifying the group of entities regarding the subset of high-priority vulnerabilities.

13. The computer-implemented method of claim 12, wherein notifying the group of entities further comprises automatically generating actionable instructions to fix the subset of high-priority vulnerabilities in an automatically generated order.

14. The computer-implemented method of claim 1, further comprising displaying the identified subset of high-priority vulnerabilities on a display device capable of displaying, searching, and querying.

15. An apparatus for providing a context-aware code security solution, comprising:
    one or more processors; and
    a memory coupled to the one or more processors, wherein the memory storing instructions that, when executed by the one or more processors, cause the apparatus to:
       receive a set of security vulnerabilities generated by a set of security tools incorporated with a continuous integration and continuous deployment (CI/CD) pipeline, wherein the set of security vulnerabilities comprises one or more vulnerabilities indicated by the set of security tools at a respective stage of a plurality of stages of the CI/CD pipeline;

receive, for the plurality of stages of the CI/CD pipeline, contextual data associated with the set of security vulnerabilities from a set of DevOps tools used by the CI/CD pipeline, wherein the contextual data comprises ownership information identifying an entity responsible for fixing a respective security vulnerability in the set of security vulnerabilities;

augment the set of security vulnerabilities with the contextual data; and prioritize the augmented security vulnerabilities to identify a subset of high-priority vulnerabilities within the set of security vulnerabilities.

16. The apparatus of claim 15, wherein the memory further stores instructions that, when executed by the one or more processors, cause the apparatus to:

include one or more metadata tags extracted from the contextual data into a corresponding augmented security vulnerability in the augmented security vulnerabilities;

apply a set of priority rules to the one or more metadata tags associated with the augmented security vulnerability.

17. The apparatus of claim 15, wherein the memory further stores instructions that, when executed by the one or more processors, cause the apparatus to:

determine a group of entities responsible for fixing the subset of high-priority vulnerabilities based on the augmented security vulnerabilities; and notify the group of entities regarding the subset of high-priority vulnerabilities.

18. The apparatus of claim 15, wherein the contextual data further comprises one or more of the following context types:

an environmental context; and a business context.

19. A continuous integration and continuous deployment (CI/CD) pipeline integrated with a context-aware security platform, comprising:

a pre-production environment including at least a build and test stage for generating a piece of executable code of an asset;

a post-production environment including at least a cloud server for deploying the piece of executable code of the asset;

a set of security scanners configured to scan the piece of executable code in the pre-production environment and the post-production environment; and a context-aware code security platform configured to:

receive a set of security vulnerabilities generated by the set of security scanners, wherein the set of security vulnerabilities comprises one or more vulnerabilities indicated by the set of security scanners at a respective stage of a plurality of stages of the CI/CD pipeline;

receive, for the plurality of stages of the CI/CD pipeline, contextual data associated with the set of security vulnerabilities from the pre-production environment and the post-production environment, wherein the contextual data comprises ownership information identifying an entity responsible for fixing a respective security vulnerability in the set of security vulnerabilities;

augment the set of security vulnerabilities with the contextual data; and prioritize the augmented security vulnerabilities to identify a subset of high-priority vulnerabilities within the set of security vulnerabilities.

20. The CI/CD pipeline of claim 19, wherein the context-aware code security platform is further configured to:

include one or more metadata tags extracted from the contextual data into a corresponding augmented security vulnerability; and apply a set of priority rules to the one or more metadata tags associated with the augmented security vulnerability.

* * * * *